(12) United States Patent
Przykucki et al.

(10) Patent No.: US 10,894,572 B2
(45) Date of Patent: Jan. 19, 2021

(54) SENSOR ASSEMBLY FOR PIVOTING SUSPENSION OF BICYCLE

(71) Applicant: MOTION INSTRUMENTS, INC., Redwood City, CA (US)

(72) Inventors: Robert J. Przykucki, Redwood City, CA (US); Randy Fette, Santa Rosa, CA (US); Michael Chartier, Plymouth, MN (US)

(73) Assignee: MOTION INSTRUMENTS, INC., Redwood City, CA (US)

( * ) Notice: Subject to any disclaimer, the term of this patent is extended or adjusted under 35 U.S.C. 154(b) by 51 days.

(21) Appl. No.: 16/124,530

(22) Filed: Sep. 7, 2018

(65) Prior Publication Data

US 2020/0079461 A1    Mar. 12, 2020

(51) Int. Cl.
```
G01D 5/14      (2006.01)
B62K 19/30     (2006.01)
H01F 7/02      (2006.01)
B62J 45/40     (2020.01)
```
(52) U.S. Cl.
CPC .............. B62K 19/30 (2013.01); G01D 5/14 (2013.01); H01F 7/0273 (2013.01); *B62J 45/40* (2020.02)

(58) Field of Classification Search
CPC .......... G01D 5/14; G01D 5/145; B62K 19/30; H01F 7/14; H01F 7/17; H01F 7/145; H01F 7/0273; G01B 7/003; G01B 7/14
See application file for complete search history.

(56) References Cited

U.S. PATENT DOCUMENTS

| | | | |
|---|---|---|---|
| 4,642,496 A * | 2/1987 | Kerviel .................. | H02K 29/08 310/68 B |
| 4,810,000 A * | 3/1989 | Saunders ................. | B62H 1/12 280/293 |
| 6,566,864 B1 * | 5/2003 | Brown .............. | B29C 45/14754 280/6.15 |
| 6,659,895 B2 * | 12/2003 | Fukuda ................. | B62M 9/122 324/168 |
| 9,651,438 B2 * | 5/2017 | Tokito ..................... | G01P 1/026 |
| 9,676,444 B2 * | 6/2017 | Shipman ................ | B62M 9/122 |

\* cited by examiner

*Primary Examiner* — Minh N Tang
(74) *Attorney, Agent, or Firm* — Mark Young, P.A.

(57) ABSTRACT

A sensor assembly includes a shank shaped for mating with a socket in a head of a bolt about which a portion of a rear suspension of a bicycle pivots. A magnetometer (or a permanent magnet) is coupled to the shank. A permanent magnet with a north pole and a south pole (or a magnetometer) is positioned adjacent to the magnetometer (or permanent magnet) and pivotable relative thereto. A linkage couples the permanent magnet (or magnetometer) to the portion of the rear suspension that pivots about the bolt. The magnetometer senses changes in the magnetic field as the suspension pivots.

17 Claims, 9 Drawing Sheets

SENSOR ASSEMBLY FOR PIVOTING SUSPENSION OF BICYCLE

FIELD OF THE INVENTION

This invention relates generally to motion sensors, and, more particularly, to a sensor assembly for sensing pivoting motion of a component of a bicycle suspension.

BACKGROUND

Many bicycles, particularly mountain bikes, are equipped with adjustable suspensions. Adjustable front suspensions include shock absorbers integrated with the fork. Each shock absorber includes a tube or shaft coupled to a piston within a cylinder. The cylinder contains a fluid for damping. One or more adjustable valves or orifices in the piston regulate passage of fluid as the piston moves within the cylinder.

A rear suspension includes a pivoting rear triangle, which holds the rear wheel, and one or more pivot points to enable the wheel to travel through a range of motion. A shock absorber is located inside a main frame triangle, with one end attached to the main triangle and one end attached to the pivoting rear triangle. As with the front fork, rear suspension models feature variation in travel and adjustments.

A correctly tuned rear suspension can make a good bicycle feel and handle great, but an un-tuned suspension can make even a superior bike feel and handle terrible. Many bicyclists with such suspensions are moderately aware of the adjustments and the effect each adjustment should have. However, heretofore, bicyclists must make the adjustments by trial and error, typically overshooting and then under-shooting optimal settings for a trail and/or their riding ability and style. Trial and error entails riding a trail and then making adjustments, and then riding the trail again and making new adjustments. The adjustments are made based upon a vague recollection of the ride and subjective assessment of performance. Such a process is not only inefficient, but prone to error.

What is needed is an easy-to-use, reliable, durable device that provides meaningful data regarding the performance of a pivoting suspension throughout a ride. Such data should be useful for tuning a suspension by increasing or decreasing sag, high/low rebound damping and high/low speed compression damping. The data should indicate the range of travel of a suspension regardless of static or dynamic use. By knowing the position of the suspension over a period of time, many metrics can be derived from the data, either in real time or post analysis.

The invention is directed to overcoming one or more of the problems and solving one or more of the needs as set forth above.

SUMMARY OF THE INVENTION

To solve one or more of the problems set forth above, in an exemplary implementation of the invention, a sensor assembly for sensing pivoting motion of a component of a bicycle suspension is provided. The sensor assembly includes a shank having a non-circular cross-sectional shape for mating with a socket in a head of a bolt about which a portion of a rear suspension of a bicycle pivots. The shank may be shaped and sized to securely plug into (i.e., mate with) a socket (e.g., a hexagonal or hexalobular socket) of the head of the bolt. A magnetometer is coupled to the shank. A permanent magnet with a north pole and a south pole is positioned adjacent to the magnetometer and pivotable relative to the magnetometer. The permanent magnet generates a magnetic field. The magnetometer senses changes in the magnetic field as the permanent magnet pivots. A linkage is coupled to the permanent magnet. The linkage is connectable to the portion of the rear suspension that pivots about the bolt. A microcontroller operably coupled to the magnetometer samples and digitizes signals from the magnetometer, and produces output (e.g., data) therefrom. A radio frequency transmitter, more preferably a transceiver, is operably coupled to the microcontroller. The radio frequency transmitter or transceiver wirelessly communicates output from the microcontroller to a computing device, such as a smartphone.

In one exemplary embodiment, a first housing module contains the magnetometer. The magnetometer is attached to the housing module. The shank is attached to the first housing module. A second housing module contains the permanent magnet. The permanent magnet is attached to the second housing module. The linkage is attached to the second housing module. The second housing module is rotatable (pivotable) relative to the first housing module. A bearing assembly rotatably couples the first housing module to the second housing module.

In another embodiment, a housing module contains the permanent magnet. The permanent magnet is attached to the housing module. The linkage is attached to the housing module. A shaft couples the magnetometer to the shank. The shaft extends between the magnetometer and the shank. The shaft extends through a bearing assembly in the housing module. The housing module is pivotable relative to the shaft.

In one exemplary alternative embodiment, a first housing module contains the permanent magnet. The permanent magnet is attached to the housing module. The shank is attached to the first housing module. A second housing module contains the magnetometer. The magnetometer is attached to the second housing module. The linkage is attached to the second housing module. The second housing module is rotatable (pivotable) relative to the first housing module. A bearing assembly rotatably couples the first housing module to the second housing module.

In another alternative embodiment, a housing module contains the magnetometer. The magnetometer is attached to the housing module. The linkage is attached to the housing module. A shaft couples the permanent magnet to the shank. The shaft extends between the permanent magnet and the shank. The shaft extends through a bearing assembly in the housing module. The housing module is pivotable relative to the shaft.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

Figure 1:
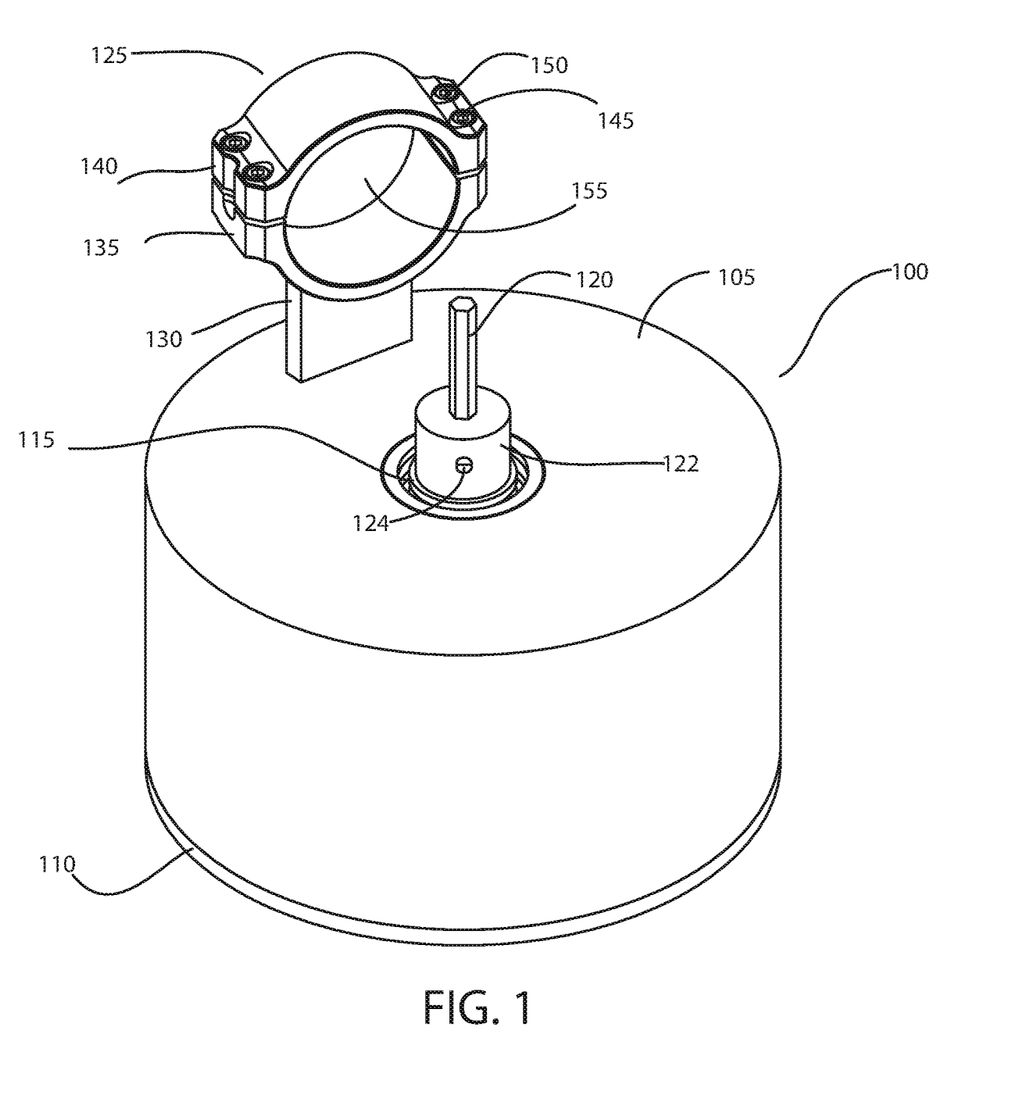
FIG. 1 is a first perspective view of an exemplary sensor assembly for sensing pivoting motion of a component of a bicycle suspension according to principles of the invention.

FIG. 1 provides a perspective view of an exemplary sensor assembly 100 according to principles of the invention. The assembly includes a housing 105 with a removable cover 110. While a cup-shape is shown, the housing 105 is not limited to any particular shape. The housing 105 contains circuit components and a sensing element, discussed below. The removable cover 110 protects the contents of the housing 105 from water and debris such as plants, rocks, mud and dirt.

A clamp assembly 125 is attached to the housing 105. The clamp assembly 125 includes an arm 130, a first concave clamping member 135 with flanged sides, a second concave clamping member 140 with flanged sides, and a plurality of screws 145, 150 securing each flanged sides of the clamping members 135, 140 together. A passage is 155 is formed in the space between the opposed concave clamping members 135, 140. The passage 155 is sized and shaped to clamp onto a pivoting element of a bicycle frame. The arm 130 is shaped and sized to position the clamp assembly 125 at the clamped pivoting element of the bicycle frame.

A shank 120 extends from a cylindrical shaft 122. The shank 120 is shaped to securely plug into the head of a nut or bolt that defines a center of rotation for the clamped pivoting element of the bicycle frame. While a shank 120 with a hexagonal cross section shape is shown, other shapes may be used to mate with a particular nut or bolt. For example, the shank 120 may have a six-point star shaped cross-section shape to mate with nuts or bolts having a hexalobular internal head (e.g., a Torx® head). Nonlimiting examples of other shapes include square, flat and Phillips head.

The shank 120 is attached to the shaft 122. The shaft 122 extends through a bearing 115. The shank 120 may be removable using a set screw 124. In such an embodiment, the shank may be partially extended or retracted or replaced with a longer or shorter shank, as may be needed to properly fit a bicycle.

The shaft 122 rotates relative to the housing 105. As a clamped pivoting element of the bicycle pivots, the housing 105 rotates relative to the shaft 122. In the exemplary embodiment, a bearing 115 is provided in the housing to facilitate rotation of housing 105 relative to the shaft 122.

Figure 2:
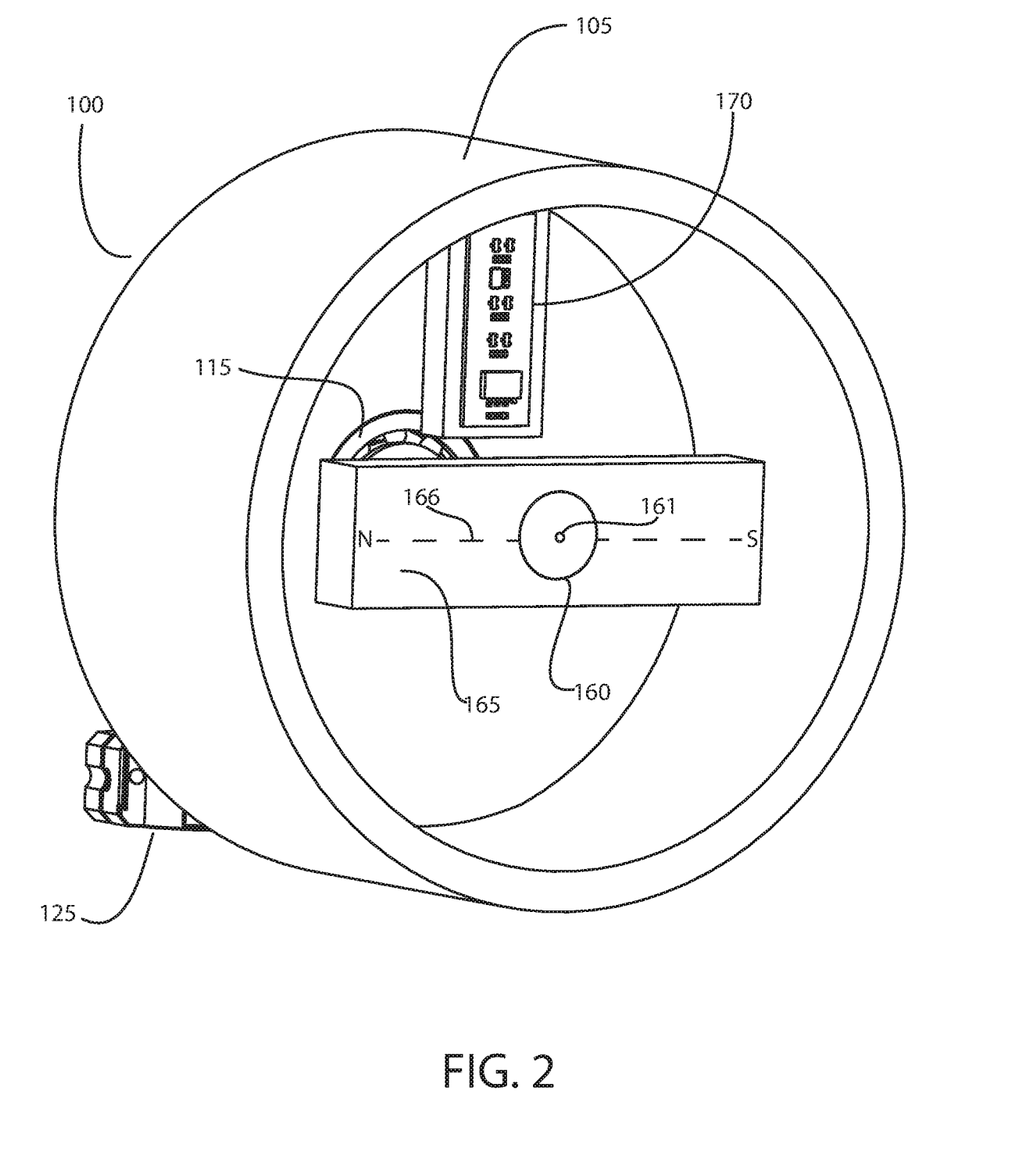
FIG. 2 is a second perspective view of an exemplary sensor assembly, with a removed cover, for sensing pivoting motion of a component of a bicycle suspension according to principles of the invention.

Referring now to FIG. 2, the opposite side of the sensor assembly 100 is shown. In FIG. 2, the cover 110 is removed to reveal contents of the housing 105. The cover 110 may be removably attached to the housing 105 in any suitable manner, such as with screws, snap fit attachments, threaded engagement or press fit engagement.

The housing 105 contains a shaft 160, a magnet 165 attached, directly or indirectly, to the shaft 160, and a circuit 170. The shaft 160 may be an extension of shaft 122, or another shaft attached to shaft 122. As shaft 122 rotates relative to the housing 105, so does shaft 160 rotate relative to the housing 105.

A magnet 165 is, directly or indirectly, attached to shaft 160. The magnet 165 is preferably a permanent magnet. By way of example and not limitation, the permanent magnets may be made from a ferromagnetic material or rare earth element, such as alnico, i.e., an aluminum (Al), nickel (Ni) and cobalt (Co) iron (Fe) alloy; ferrite, i.e., a ceramic material comprised of iron(III) oxide (Fe2O3) blended with small proportions of one or more additional metallic elements, such as barium, manganese, nickel, and zinc; neodymium, i.e., a rare-earth magnet comprised of an alloy of neodymium, iron and boron to form the Nd2Fe14B tetragonal crystalline structure; or samarium-cobalt, a rare earth magnet comprised of an alloy of samarium and cobalt, generally SmCo5 namely SmCo Series 1:5, or Sm2Co17 namely SmCo Series 2:17. As an alternative, the magnet may comprise an electromagnet powered by a battery attached to the magnet structure.

The magnet is not limited to a particular size. Any size magnet that generates a magnetic field capable of being sensed by a magnetometer may be utilized.

The magnet 165 has a north pole (N) and a south pole (S), opposite the north pole (N). An axis 166 extending from the north pole (N) to the south pole (S) of the magnet 165 is orthogonal to the axis 161 of rotation.

A circuit 170, which is also described below, is attached to the housing. The circuit 170 performs several functions. First, the circuit includes a magnetic field sensor (e.g., a magnetometer) that senses changes in the magnetic field of the magnet 165. As the magnet 165 rotates (e.g., pivots) relative to the housing 105, the direction of the magnetic field changes. In one non-limiting example, the magnetometer is comprised of a plurality of magnetoresistive devices. These devices may be made of thin strips of permalloy (NiFe magnetic film) whose electrical resistance varies with a change in magnetic field. They have a well-defined axis of sensitivity, can be produced in 3-D versions and can be mass-produced as an integrated circuit. They have a response time of less than 1 microsecond and can be sampled up to 1,000 times/second. They can reliably resolve 0.1°.

Second, the circuit 170 digitizes output from the magnetometer. The circuit includes a microcontroller that converts analog signals from the magnetometer to digital data. The microcontroller includes an integrated (or a separate but operably coupled) analog to digital converter (ADC). The ADC converts continuous analog signals from the magnetometer to discrete-time and amplitude digital signals. The conversion involves periodic quantization of the input, i.e., sampling the input.

Third, the circuit 170 communicates the digital data to a remote computing device. In an exemplary embodiment, the data is communicated wirelessly, i.e., via radio frequency communication, from a transceiver included in the circuit to a remote computing device such as a smart phone. In a particular preferred embodiment, a short range RF communication module and protocol are used to accomplish communication with the remote computing device. By way of example and not limitation, the transceiver is a Bluetooth Low Energy (BLE) module. Today, personal computing and mobile operating systems, including iOS, Android, Windows Phone and BlackBerry, as well as macOS, Linux, Windows 8 and Windows 10, natively support Bluetooth Low Energy.

Optionally, the circuit may include nonvolatile memory for data storage and a wired (e.g., universal serial bus) interface for wired communication and configuration with a computing device. Stored data may be downloaded in batch mode when desired.

The circuit 170 also includes a battery. The battery may be rechargeable or disposable. In the case of a rechargeable battery, the circuit may include a wired interface (e.g., universal serial bus) for recharging, which may also be used for data communication. Additionally, in the case of a rechargeable battery the circuit 170 may also include a battery charging circuit to prevent overcharging the rechargeable battery.

Figure 3:
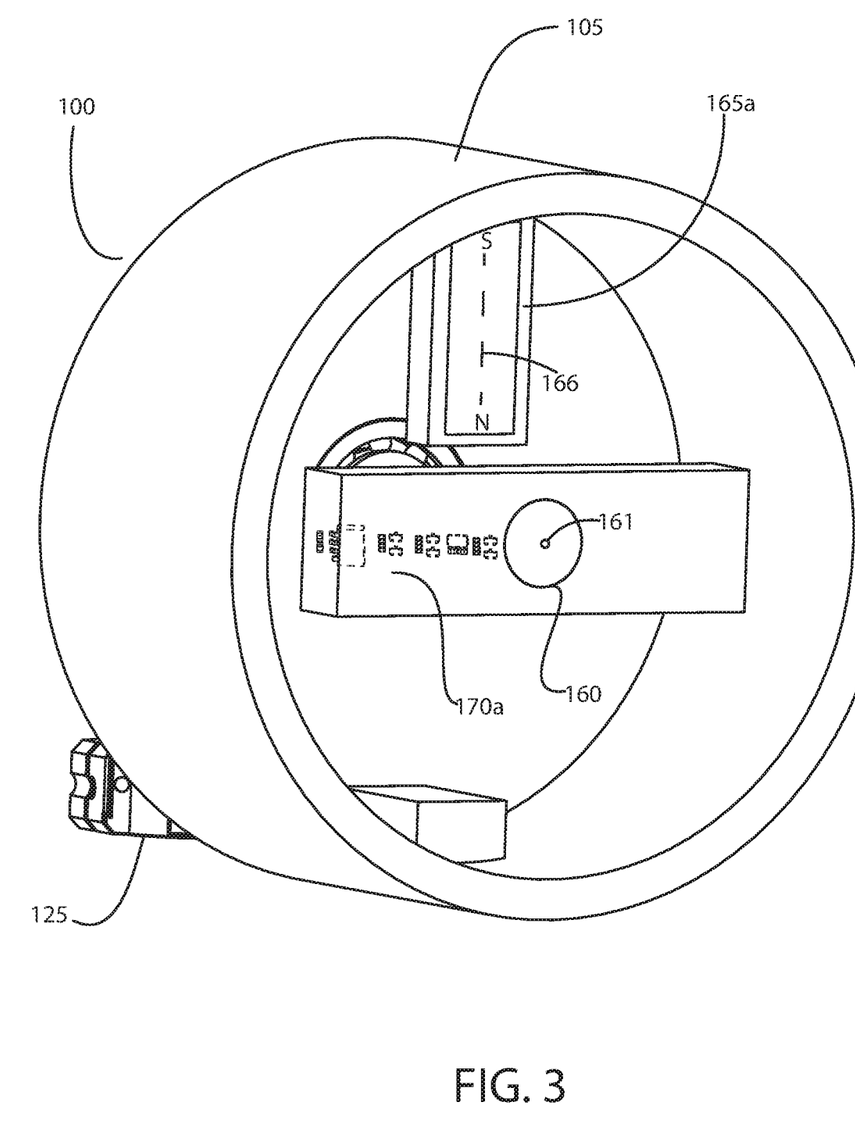
FIG. 3 is a perspective view of an alternative embodiment of an exemplary sensor assembly, with a removed cover, for sensing pivoting motion of a component of a bicycle suspension according to principles of the invention.

FIG. 3 is a perspective view of an alternative embodiment of an exemplary sensor assembly 100, with a removed cover, for sensing pivoting motion of a component of a bicycle suspension according to principles of the invention. In this embodiment, the magnet 165a is fixed to the housing 105 and the circuit 170a is attached to shaft 160. As the housing 105 pivots relative to the shaft 160, the magnet 165a moves relative to the circuit 170a.

Figure 4:
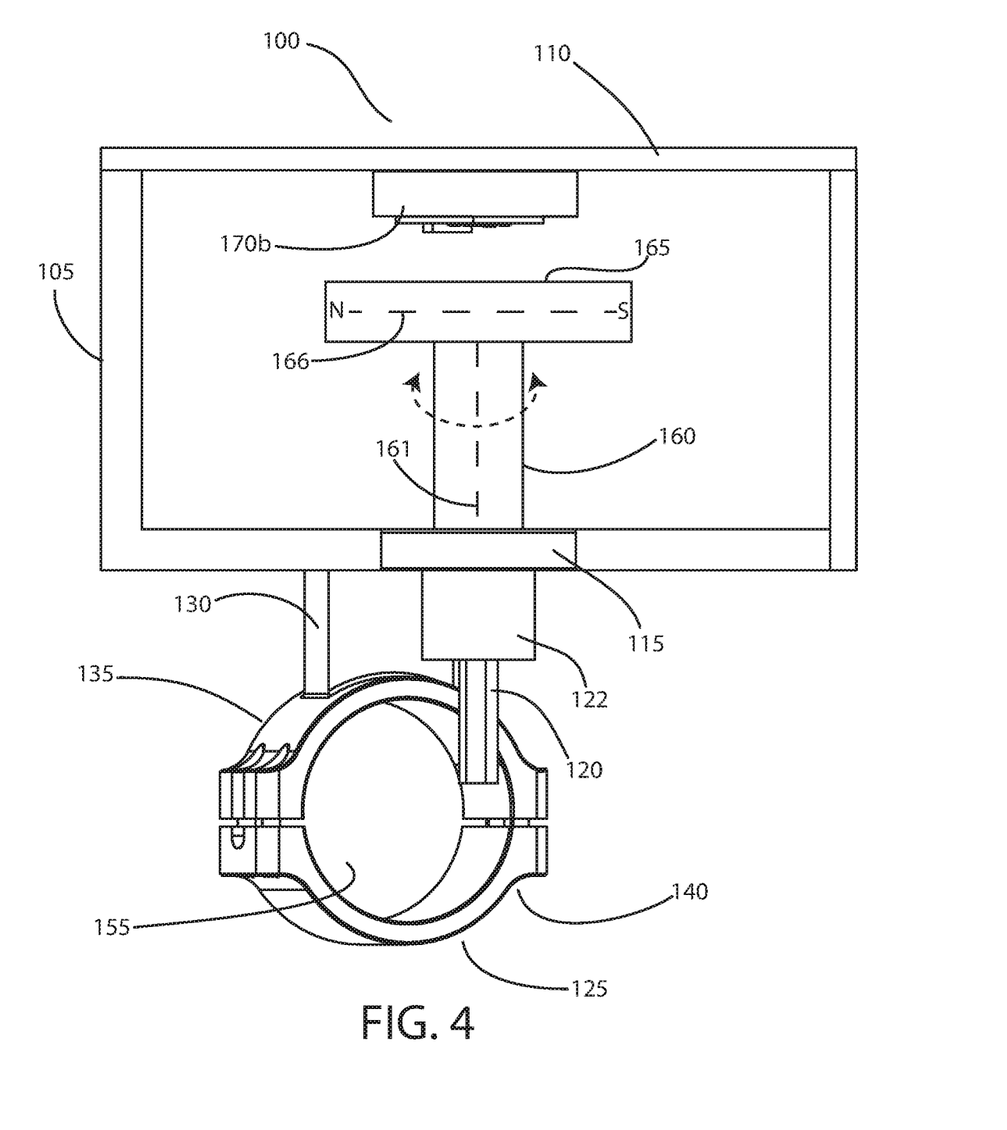
FIG. 4 is a section view of an alternative embodiment of an exemplary sensor assembly, with a removed cover, for sensing pivoting motion of a component of a bicycle suspension according to principles of the invention.

In FIG. 4, a section view of another alternative embodiment of a sensor assembly according to principles of the invention is provided. In this embodiment, the circuit 170b is aligned with the magnet 165b, i.e., the center of the circuit 170b is aligned with the center of the magnet 165b. More specifically, the center of the magnetometer of the circuit 170b is aligned with the center of the magnet 165b. The circuit 170b is spaced apart from the magnet 165b, so as not to impede relative motion between the magnet and circuit.

The sensor assembly 100 is not limited to the circuit attachment shown in FIG. 4. There the circuit 170b is shown attached to the removable cover 110. Alternatively, the circuit may be attached to a support structure extending from the housing 105. As another alternative, the circuit 170b may be attached to the shaft 160, and the magnet 165b may be attached to the removable cover 110 or to a support structure extending from the housing 105. In each such embodiment, the center of the magnetometer of the circuit 170b is aligned with the center of the magnet 165b and the circuit 170b is spaced apart from the magnet 165b, so as not to impede relative motion.

Figure 5:
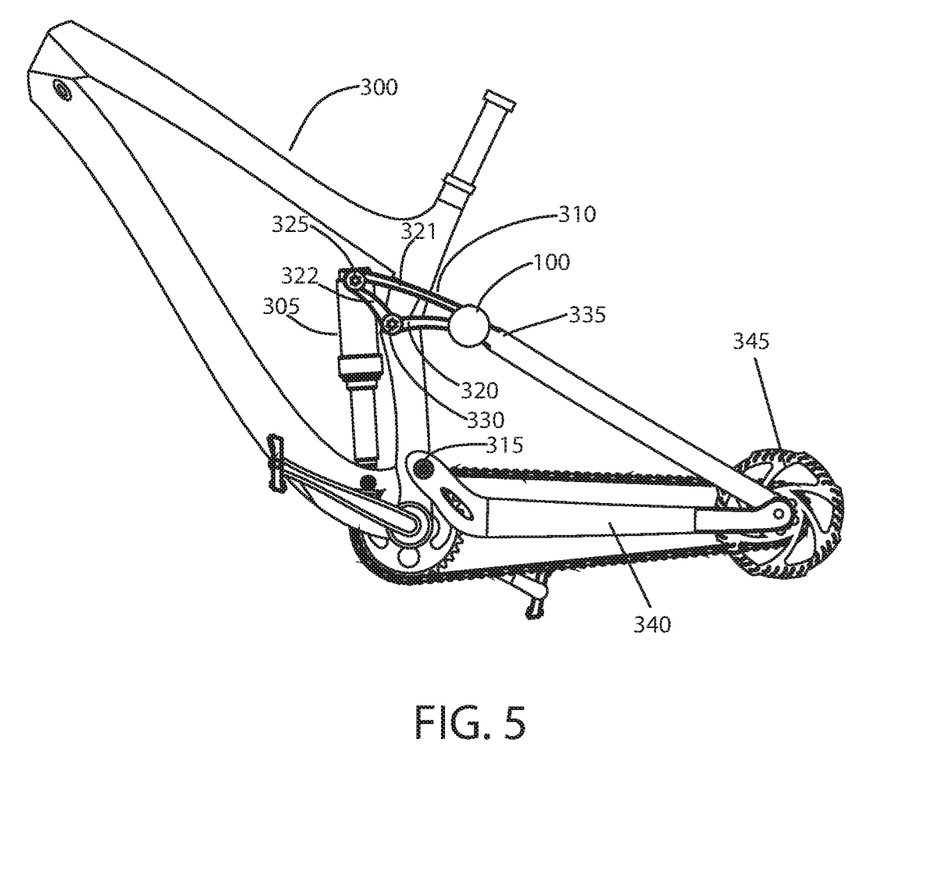
FIG. 5 is a side view of an exemplary sensor assembly for sensing pivoting motion attached to a rear bicycle suspension according to principles of the invention.

FIG. 5 is a side view of an exemplary sensor assembly 100 for sensing pivoting motion attached to a rear bicycle suspension according to principles of the invention. The sensor is shown in one of several possible attachment locations. As such suspensions vary considerably in structure and operation, the illustrated suspension is provided as a non-limiting example.

With reference to FIG. 5, a pivoting upper support 335 extends between triangle 310 and the rear sprocket 345. An attachment bolt 332, which is concealed by the sensor assembly 100 in FIG. 5, pivotally secures the upper support 335 to the triangle. A pivoting lower support 340 extends between the rear sprocket 345 and the frame 300. The lower support is pivotally attached to the frame with a bolt 315. The triangle 310 pivots about bolt 330. A damper or shock absorber 305 is pivotally attached to the frame 300 and triangle 310 by bolt 325. The triangle 310 pivots relative to attachment 330, as the upper and lower supports 335, 340 pivot in response to bumps. The shock absorber 305 dampens pivoting motion of the triangle 310. Attachment bolts (e.g., 325, 330 and the bolt 332 concealed by sensor assembly 100 in FIG. 5) do not pivot.

Figure 6:
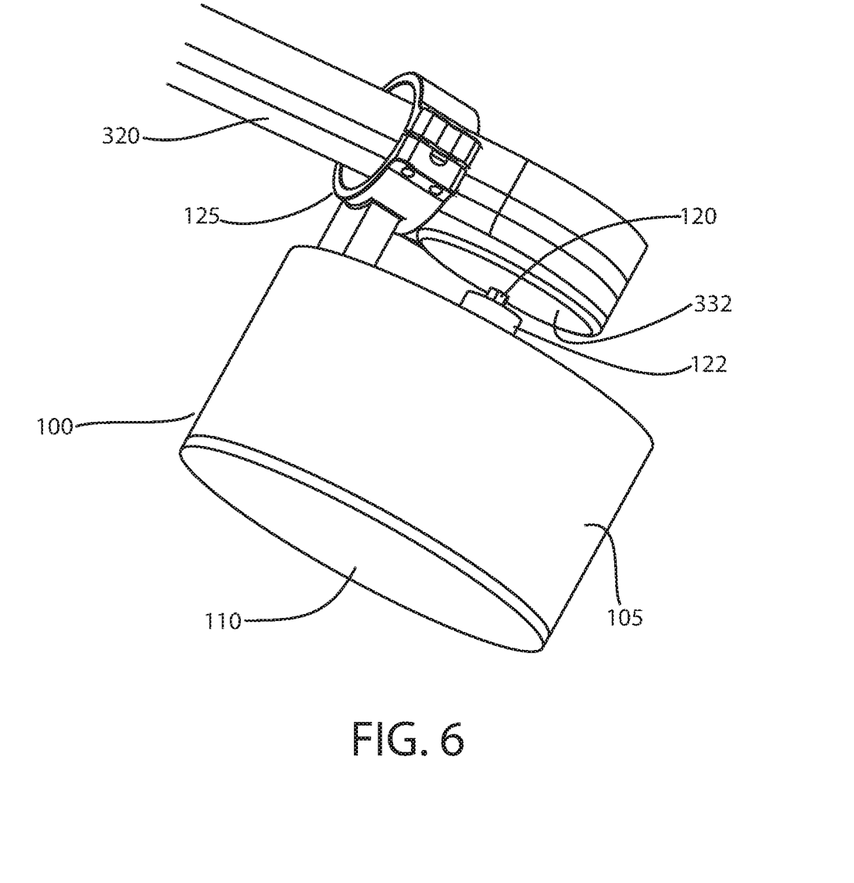
FIG. 6 is a perspective view of an exemplary sensor assembly for sensing pivoting motion attached to a component of a rear bicycle suspension according to principles of the invention.

Referring to FIG. 6, a close-up perspective view of the sensor assembly 100 attached to a portion of the triangle 310 is shown. The clamp 125 of the sensor assembly engages a portion of the triangle, such as pivoting arm 320. The free end of shank 120 is inserted into and mates with the head of the bolt 332. Because the bolt 332 does not pivot, the shank 120 that is engaged by the head of the bolt 332 does not pivot. Likewise, the shafts 122, 160 attached to the shank do not pivot. As the clamped arm 320 pivots, the housing 105 of the sensor assembly 100 pivots. Thus, the housing 105 pivots relative to the shank 120 and shafts 122, 160. Consequently, the magnet or circuit attached to the housing pivots relative to the circuit or magnet attached to the shaft 160.

Figure 7:
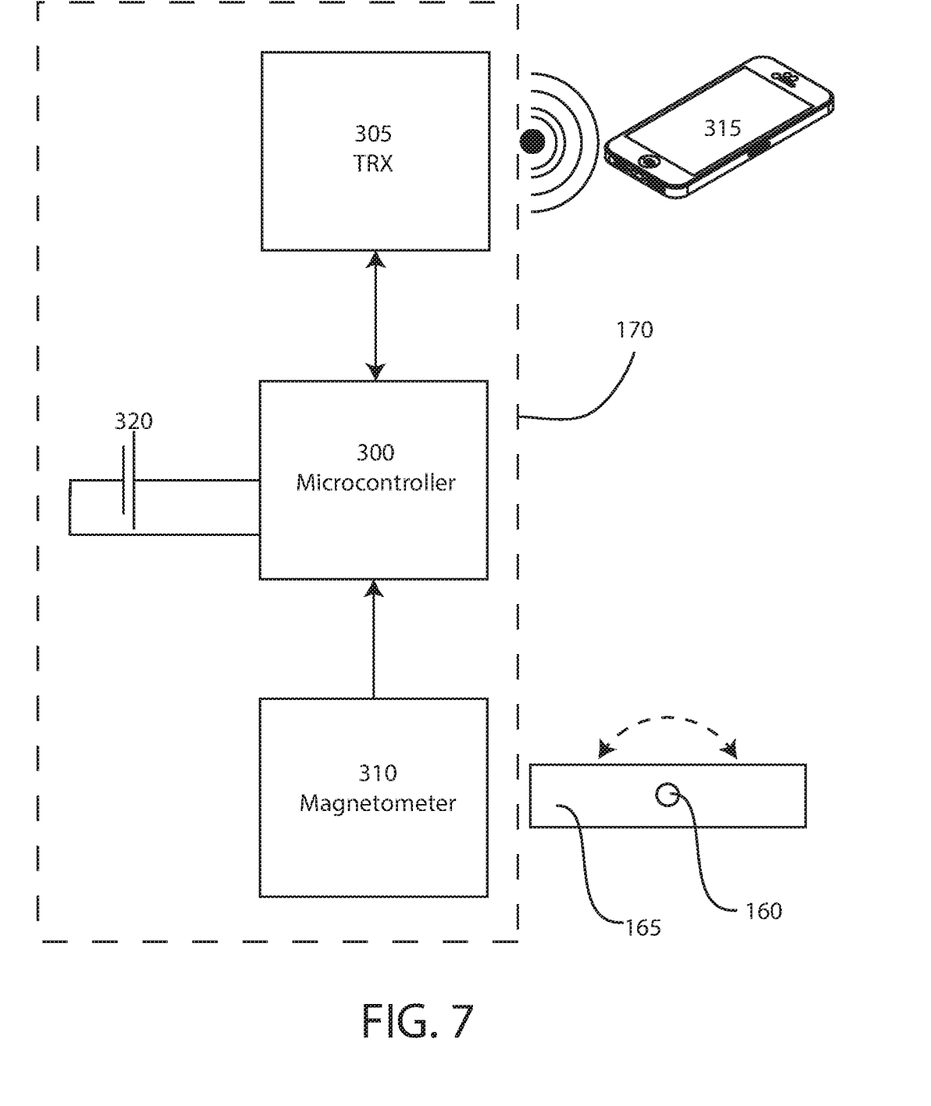
FIG. 7 is a high level block diagram of circuitry for an exemplary sensor assembly for sensing pivoting motion of a component of a bicycle suspension according to principles of the invention.

FIG. 7 is a high level block diagram of circuitry 170 for an exemplary sensor assembly for sensing pivoting motion of a component of a bicycle suspension according to principles of the invention. The circuit 170 the circuit includes a magnetometer 310 that senses changes in the magnetic field of the magnet 165. As the magnet 165 rotates (e.g., pivots with shaft 160) relative to the housing 105, the direction of the magnetic field changes. In one non-limiting example, the magnetometer 310 is comprised of a plurality of magnetoresistive devices. These devices may be made of thin strips of permalloy (NiFe magnetic film) whose electrical resistance varies with a change in magnetic field. They have a well-defined axis of sensitivity, can be produced in 3-D versions and can be mass-produced as an integrated circuit. They have a response time of less than 1 microsecond and can be sampled up to 1,000 times/second. They can reliably resolve 0.1°. However, the invention is not limited to magnetoresistive devices. Other sensing elements capable of sensing changing direction of a magnetic field may be used without departing from the scope of the invention.

The magnetometer 310 is operably coupled to a controller, such as microcontroller 300. While a single line is shown in the high level diagram of FIG. 7, it is understood that multiple lines, pins, traces or other conductive connections may be required and used. For example, a pair of lines may supply power to the magnetometer 310, if the magnetometer 310 requires power to be supplied. The power may be supplied directly from the battery 320, or from a voltage regulator (not shown) operably coupled to the battery 320, or from the microcontroller 300. Output (e.g., analog output) from the magnetometer 310 is supplied to the microcontroller 300 by one or more connections. Thus, the magnetometer 310 is operably coupled to the microcontroller 300.

The microcontroller 300 digitizes output from the magnetometer 310 by converting analog signals from the magnetometer to digital data. The microcontroller 300 includes an integrated (or a separate but operably coupled) analog to digital converter (ADC). The ADC converts continuous analog signals from the magnetometer 310 to discrete-time and amplitude digital signals. The conversion involves periodic quantization of output from the magnetometer 310, i.e., sampling the magnetometer output. The digital data represents changes in the sensed magnetic field, which represents pivoting rotation of the magnet 165 relative to the circuit 170, or vice versa. Such pivoting rotation corresponds to relative pivoting rotation of the clamped and engaged suspension components described above.

The microcontroller 300 communicates the digital data to a remote computing device. In the exemplary embodiment, the data is communicated wirelessly, i.e., via radio frequency communication, from a transceiver 305. The transceiver 305 is operably coupled to the microcontroller 300. While a single line is shown in the high level diagram of FIG. 7, it is understood that multiple lines, pins, traces or other conductive connections may be required and used. For example, a pair of lines may supply power to the transceiver 305. The power may be supplied directly from the battery 320, or from a voltage regulator (not shown) operably coupled to the battery 320, or from the microcontroller 300.

Input to the transceiver 305 is supplied from the microcontroller 300 by one or more connections. The input includes the digital data representing the change in the magnetic field. Other data, such as a system identifier, date and time stamps and header information may be included in the input.

The transceiver 305 communicates output to a remote computing device, such as a smart phone 315. The communication is wireless. As a nonlimiting example, the transceiver 305 includes an antenna, a transmitter, a receiver, and a local oscillator (LO) or frequency synthesizer. The transmitter modulates, upconverts, and amplifies signals for transmission into free space. The receiver detects signals in the presence of noise and interference, and provides amplification, downconversion and demodulation of the detected signal such that it can be used in a data processor. The local oscillator (LO) or frequency synthesizer provides a reference signal to both the transmitter for upconversion and the receiver for downconversion. The transceiver may be comprised of separate operably coupled components or formed as a single integrated circuit. The invention is not limited to any particular transceiver.

In a particular preferred embodiment, the transceiver 305 is a short range RF communication module that implements a protocol used to accomplish communication with the remote computing device 315. By way of example and not limitation, the transceiver 305 may be a Bluetooth Low Energy (BLE) module. Today, personal computing and mobile operating systems, including iOS, Android, Windows Phone and BlackBerry, as well as macOS, Linux, Windows 8 and Windows 10, natively support BLE. A BLE transceiver is bidirectional, capable of sending and receiving signals.

Optionally, the circuit 170 may include nonvolatile memory for data storage and a wired (e.g., universal serial bus) interface for wired communication and configuration with a computing device. Stored data may be downloaded in batch mode when desired.

The circuit 170 also includes a battery 320. The battery 320 may be rechargeable or disposable. In the case of a rechargeable battery 320, the circuit may include a wired interface (e.g., universal serial bus) for recharging, which may also be used for data communication. Additionally, in the case of a rechargeable battery the circuit 170 may also include a battery charging circuit to prevent overcharging the rechargeable battery.

Figure 8:
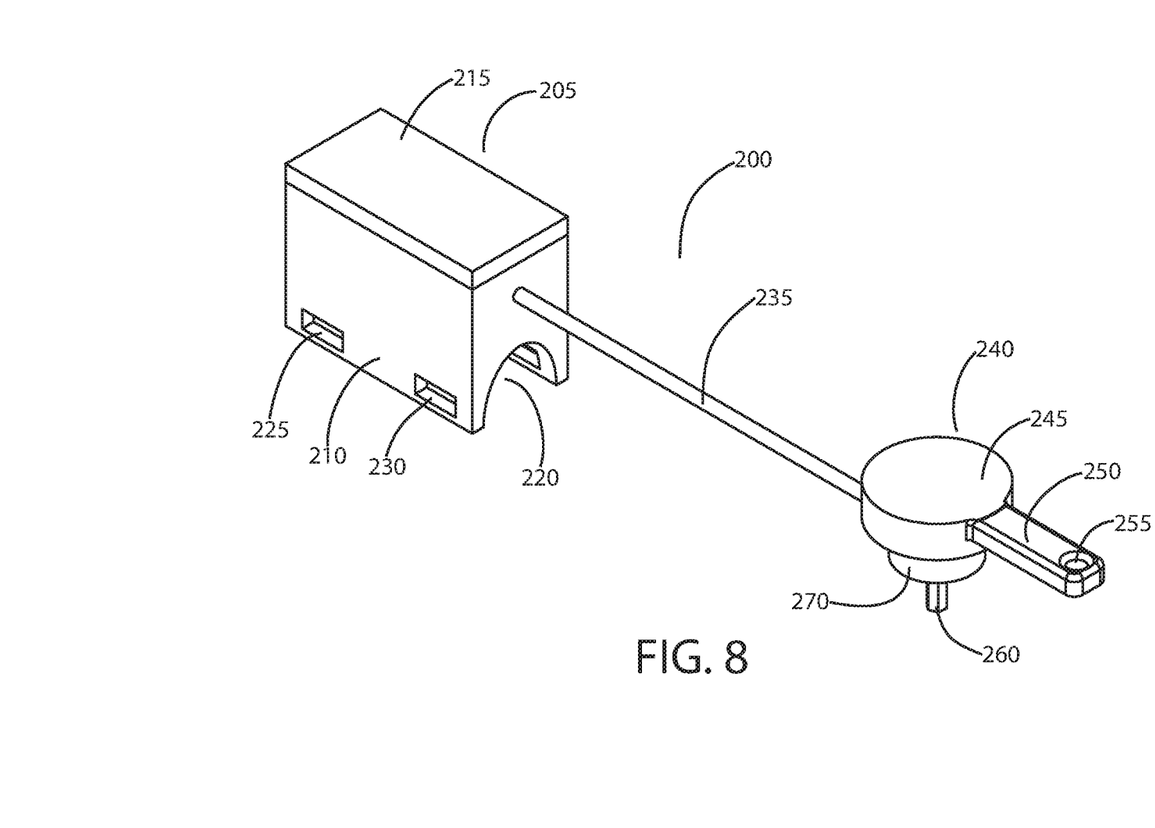
FIG. 8 is a perspective view of another alternative embodiment of an exemplary sensor assembly for sensing pivoting motion of a component of a bicycle suspension according to principles of the invention.

FIG. 8 is a perspective view of another alternative embodiment of an exemplary sensor assembly 200 for sensing pivoting motion of a component of a bicycle suspension according to principles of the invention. This embodiment includes a first housing assembly 205 for the microcontroller 300, transceiver 305 and battery 320 and a separate second housing 240 for the magnetometer 310 and magnet 165, coupled by wires extending through a flexible sheath 235. This distributed embodiment allows for reduction in size of the housing for the sensing element. The two housings are separately mounted to the bicycle apart from each other.

The first housing assembly 205 includes a removable cover 215. The removable cover 215 protects the contents of the housing assembly 205 from water and debris such as plants, rocks, mud and dirt. The cover 215 may be removably attached to the housing body 210 in any suitable manner, such as with screws, snap fit attachments, threaded engagement or press fit engagement. In an alternative embodiment, the cover may be permanently attached and a separate compartment may be provided for replacing disposable batteries.

The bottom 210 of the housing body 210 includes structure or components for attachment to an element of a bicycle frame. A nonlimiting example of such a structure is the saddle-shaped concavity 220 with slits 225 through which clamps, tethers or cable ties extend to mechanically secure the housing body to a frame.

The second housing assembly 240 includes a cover 245. A lever arm 250 extends from the cover. The lever arm includes a mounting aperture 255 through the end of the arm 250. A base 270 is rotatably coupled to the cover 245. The cover 245 may rotate (i.e., pivot) relative to the base 270. As discussed below, a bearing facilitates the rotation. A shank 260 is fixed to and extends from the base 270. The sheath 235 extends from the housing body 210 to the base 270.

The lever arm 250 couples to a pivoting component of the rear suspension of a bicycle. Attachments such as a tether, cable tie or clamp may be used to couple the arm 250 to the pivoting component. The attachment may connect to the arm 250 using the aperture 255.

The shank 260 is shaped to securely plug into the head of a nut or bolt that defines a center of rotation for the clamped pivoting element of the bicycle frame. While a shank 260 with a hexagonal cross section shape is shown, other shapes may be used to mate with a particular nut or bolt. For example, the shank 260 may have a six-point star shaped cross-section shape to mate with nuts or bolts having a hexalobular internal head (e.g., a Torx® head). Nonlimiting examples of other shapes include square, flat and Phillips head.

Figure 9:
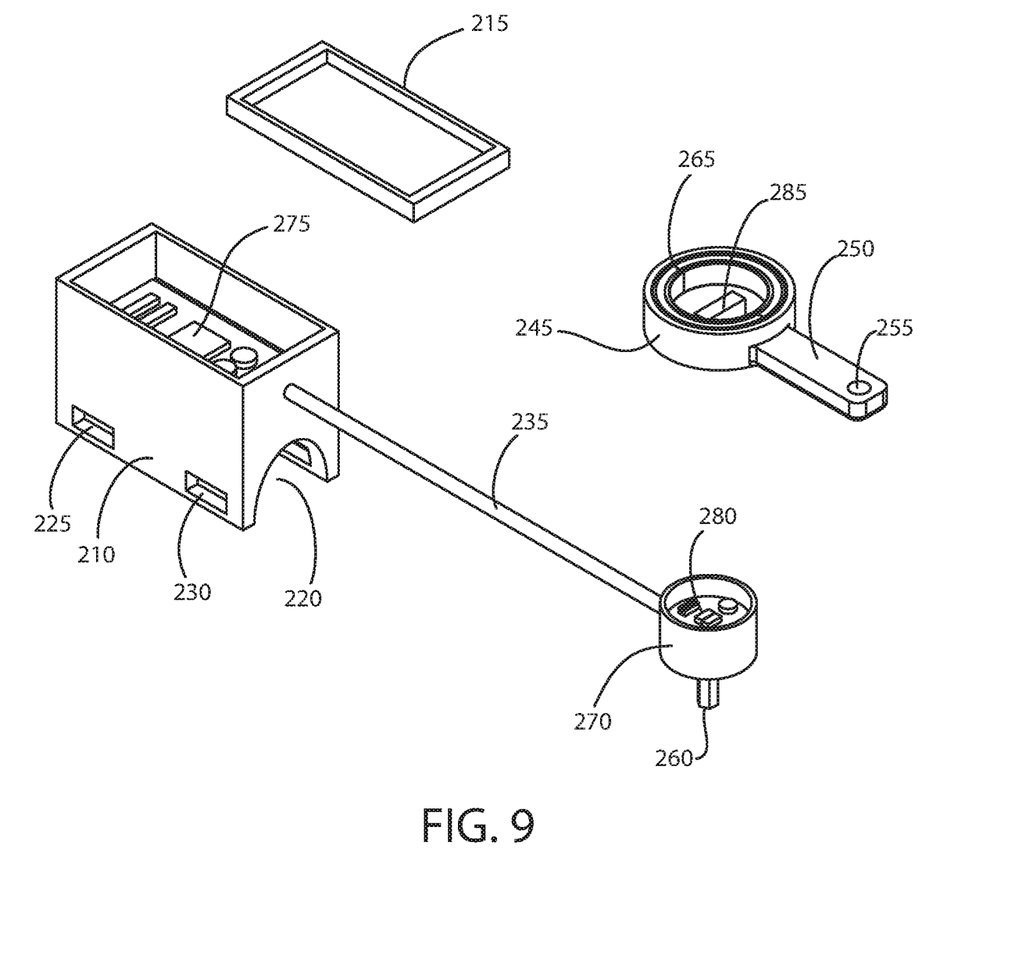
FIG. 9 is a perspective view of another alternative embodiment of an exemplary sensor assembly, with removed inverted covers, for sensing pivoting motion of a component of a bicycle suspension according to principles of the invention.

In FIG. 9, the covers 215, 245 of the exemplary sensor assembly 200 of FIG. 8 are removed and inverted. Contents of the base 260, cover 245 and housing body 210 are revealed. A magnet 285 is fixed in the cover 245. The base 270 contains a magnetometer 280 and associated circuitry. Wires (not shown) extend through the sheath 235 and electrically couple the magnetometer 280 to the circuit 275 in the housing body 210. The circuit 275 in the housing body 210 includes the microcontroller 300, transceiver 305 and battery 320. Thus, the assembly 200 of FIGS. 8 and 9 is a distributed system with circuit components located separately, which then coordinate their actions by communicating signals.

A bearing assembly 265 is disposed between the cover 245 and base 270. The exemplary bearing assembly 265 is a race bearing, with inner and outer races and a plurality of balls between the races. Each race is a ring with a groove where the balls remain. In the embodiment shown in FIG. 9, the outer periphery of the base 260 is securely received in the inner race of the bearing assembly 265, while the outer race of the bearing assembly 265 is securely received within the inner periphery of the cover 245.

The assembly 200 of FIGS. 8 and 9 is installed on a bicycle by attaching the first housing assembly 205 to a structure of the frame of the bicycle, while the shank is mated into the head of a bolt at a pivot point of the suspension and the lever arm 250 is connected to a component that pivots about the pivot point. Preferably, the structure to which the first housing assembly 205 is attached does not move substantially relative to the pivot point. The first housing assembly 205 is attached to the structure via the saddle-shaped concavity 220 with slits 225 through which clamps, tethers or cable ties extend to mechanically secure the housing body to a frame. An adhesive such as silicon, glue or gasket resin may be applied to the shank to maintain engagement with the mating bolt head. Clamps, tethers or cable ties attached to the lever arm 250 couple the lever arm 250 to a pivoting component of the rear suspension of a bicycle.

A remote computing device, such as a smart phone 315, laptop, personal computer or server may process output communicated from the sensor assembly 100, 200 by the transceiver 305. By way of example and not limitation, a smart phone 315 may execute an application to receive, store and process the output, which includes pivot angles.

The output may be correlated with location. Illustratively, the output may be timestamped. A smart phone equipped with a global positioning system (GPS) may track location as a function of time. Thus, each time stamped pivot angle may correspond to a particular GPS determined location. This allows determining suspension behavior at discrete locations throughout a course. The resulting data may be graphically represented on a map of the course.

Pivot angles may be converted to wheel displacements. One method of conversion entails applying principles of geometry and trigonometry to the particular pivoting suspension of the bicycle. However, another method, which is preferred, entails referring to a lookup table, or a similar data source, to correlate pivot angles with corresponding wheel displacements for the particular suspension. The application may allow a user to specify the make and model of the bicycle. A predetermined lookup table for the specified make and model correlates pivot angles to wheel displacements. The predetermined lookup table may be provided from a remote source upon installing or configuring the application. Bicycle manufacturers may supply such lookup tables, or data from which such lookup tables may be constructed.

By determining wheel displacements from sensed pivot angles, the application provides useful information to a rider. A rider can determine if and how frequently a suspension has reached maximum displacement (i.e., bottomed out). In response, a rider may adjust the suspension to ensure that the suspension does not frequently bottom out. Concomitantly, a rider can determine if the suspension is too stiff, e.g., if the pivot angles do not nearly approach maximum displacement. In that case the rider may make alternative adjustments.

Illustratively, zero degrees (calibrated) on the sensor assembly may correspond to 0 mm displacement of the rear axle. When a rider sits on the bicycle, the angle sensor may read 2 degrees, which may correlate to a rear wheel displacement of 5 mm. The lookup table may cover pivot angles from zero degrees to the maximum pivot angle, in determined increments (e.g., 1 degree, 0.1 degree increments or smaller or larger increments). Units other than degrees, e.g., radians, may be used. To resolve pivot angles that fall between increments, the application may apply rounding, truncation or interpolation.

In sum, the application determines wheel displacements from pivot angles. The pivot angles and determined displacements may be timestamped, geographically located and mapped.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A sensor assembly for sensing pivoting motion of a rear suspension of a bicycle, the bicycle including a socket in a head of a bolt about which a portion of a rear suspension of the bicycle pivots, the sensor assembly comprising:
    a shank, the shank having a non-circular cross-sectional shape for mating with a socket in a head of a bolt about which a portion of a rear suspension of a bicycle pivots;
    a housing containing a sensor, the housing being rotatable relative to the shank;
    a permanent magnet coupled to the shank;
    the sensor sensing relative rotation between the housing and the shank by sensing changes in a magnetic field produced by the permanent magnet;
    a linkage coupled to the housing, the linkage being connectable to the portion of the rear suspension that pivots about the bolt.

2. The sensor assembly according to claim 1, further comprising a microcontroller operably coupled to the sensor, the microcontroller sampling and digitizing signals from the sensor and producing output.

3. The sensor assembly according to claim 2, further comprising a radio frequency transmitter operably coupled to the microcontroller, the radio frequency transmitter wirelessly communicating output from the microcontroller.

4. The sensor assembly according to claim 2, further comprising a radio frequency transceiver operably coupled to the microcontroller, the radio frequency transceiver wirelessly communicating output from the microcontroller.

5. The sensor assembly according to claim 1, the non-circular cross-sectional shape being hexagonal and the socket in the head of the bolt having a hexagonal cross-section shape.

6. The sensor assembly according to claim 1, the non-circular cross-sectional shape being hexalobular and the socket in the head of the bolt having a hexalobular cross-section shape.

7. The sensor assembly according to claim 1, the sensor being attached to the housing.

8. The sensor assembly according to claim 1, wherein the sensor is a magnetometer, the magnetometer being attached to the housing.

9. The sensor assembly according to claim 1, a bearing assembly rotatably coupling the housing to the shank.

10. The sensor assembly according to claim 1, the sensor being attached to the housing, and
a shaft coupling a permanent magnet to the shank, the shaft extending between the permanent magnet and the shank, the sensor being adjacent to the permanent magnet,
a bearing assembly in the housing, the shaft extending through the bearing assembly.

11. The sensor assembly according to claim 1, wherein the sensor is a magnetometer, the magnetometer being coupled to the housing adjacent to the permanent magnet, and
the shank being mated with the socket in the head of the bolt about which the portion of the rear suspension pivots; and
the linkage being connected to the portion of the rear suspension that pivots about the bolt.

12. The sensor assembly according to claim 11, further comprising a microcontroller operably coupled to the magnetometer, the microcontroller sampling and digitizing signals from the magnetometer and producing output.

13. The sensor assembly according to claim 12, further comprising a radio frequency transmitter operably coupled to the microcontroller, the radio frequency transmitter wirelessly communicating output from the microcontroller.

14. The sensor assembly according to claim 12, further comprising a radio frequency transceiver operably coupled to the microcontroller, the radio frequency transceiver wirelessly communicating output from the microcontroller.

15. The sensor assembly according to claim 11, the non-circular cross-sectional shape being hexagonal and the socket in the head of the bolt having a hexagonal cross-section shape.

16. The sensor assembly according to claim 11, the non-circular cross-sectional shape being hexalobular and the socket in the head of the bolt having a hexalobular cross-section shape.

17. The sensor assembly according to claim 11, a bearing assembly rotatably coupling the housing to the shank.

\* \* \* \* \*